US010415637B2

(12) United States Patent
Yamauchi et al.

(10) Patent No.: US 10,415,637 B2
(45) Date of Patent: Sep. 17, 2019

(54) MAST SPACE OF HELICOPTER, DRIVING POWER TRANSMISSION DEVICE OF HELICOPTER INCLUDING MAST SPACER, AND HELICOPTER

(71) Applicant: KAWASAKI JUKOGYO KABUSHIKI KAISHA, Kobe-shi, Hyogo (JP)

(72) Inventors: Tomohiro Yamauchi, Inazawa (JP); Hisashi Okada, Kakamigahara (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/777,838

(22) PCT Filed: Nov. 15, 2016

(86) PCT No.: PCT/JP2016/004882
§ 371 (c)(1),
(2) Date: May 21, 2018

(87) PCT Pub. No.: WO2017/085926
PCT Pub. Date: May 26, 2017

(65) Prior Publication Data
US 2018/0340570 A1 Nov. 29, 2018

(30) Foreign Application Priority Data

Nov. 20, 2015 (JP) ................................ 2015-227383

(51) Int. Cl.
*F16C 25/08* (2006.01)
*F16C 33/58* (2006.01)
(Continued)

(52) U.S. Cl.
CPC .............. *F16C 25/08* (2013.01); *B64C 27/12* (2013.01); *B64C 27/32* (2013.01); *F16C 33/58* (2013.01);
(Continued)

(58) Field of Classification Search
CPC ...... F16C 25/08; F16C 35/063; F16C 33/586; F16C 2326/43; F16C 27/22; B64C 27/12; B64C 27/32; B64C 27/22
(Continued)

(56) References Cited

U.S. PATENT DOCUMENTS 3,322,200 A * 5/1967 Tresch ................... B64C 27/32
416/112
4,201,426 A * 5/1980 Garten ..................... F01D 5/06
384/563
(Continued)

FOREIGN PATENT DOCUMENTS

DE  102012203178 A1  9/2013
JP  H4-159421 A  6/1992

OTHER PUBLICATIONS

Eurocopter EC135 Technical Briefing, Heli-Expo, Houston, Feb. 2010, <URL:http://airbushelicoptersinc.com/images/support/TechBriefings2010/EC135-tech-briefing-Heli-Expo-4-12-2010.pdf>.
(Continued)

*Primary Examiner* — Marcus Charles
(74) *Attorney, Agent, or Firm* — Oliff PLC

(57) ABSTRACT

A mast spacer provided between a mast bearing and a mast nut in a main shaft of a helicopter, has a cylindrical spacer body. A first end of the mast spacer is a bearing contact end which is fittable to an inner race of the mast bearing. For example, the bearing contact end is provided with bearing projections which are fittable to recesses provided in the inner race of the mast bearing. The spacer body is provided with slits, for example, a spiral slits penetrating its side wall. The slits have a linear shape crossing an axial direction of the cylindrical spacer body.

10 Claims, 6 Drawing Sheets

(51) Int. Cl.
 B64C 27/12 (2006.01)
 B64C 27/32 (2006.01)
(52) U.S. Cl.
 CPC ........ *F16C 33/586* (2013.01); *F16C 2326/43* (2013.01)
(58) Field of Classification Search
 USPC ....... 384/494, 537, 551, 558, 563, 583, 585; 416/244 R; 244/17.11
 See application file for complete search history.

(56) References Cited

U.S. PATENT DOCUMENTS

| | | | | |
|---|---|---|---|---|
| 5,149,013 A * | 9/1992 | Costanzo | ................ | B64C 27/32 244/17.11 |
| 5,209,429 A * | 5/1993 | Doolin | ................... | B64C 27/32 244/17.11 |
| 5,421,656 A * | 6/1995 | Chory | .................... | B64C 27/12 384/551 |
| 5,624,232 A * | 4/1997 | Certain | ................. | B64C 27/605 416/114 |
| 6,280,141 B1 * | 8/2001 | Rampal | ................. | B64C 27/605 416/114 |
| 2003/0222171 A1 * | 12/2003 | Zoppitelli | ........... | B64C 29/0033 244/10 |
| 2015/0125299 A1 * | 5/2015 | Baskin | .................... | B64C 27/10 416/128 |
| 2016/0122039 A1 * | 5/2016 | Ehinger | ................. | B64C 27/32 416/170 R |
| 2016/0318605 A1 * | 11/2016 | Gmirya | .................. | B64C 27/10 |

OTHER PUBLICATIONS

Eric Herbst, Customer Service Symposium CS', EC135, Oct. 5, 2010, <URL:http://airbushelicoptersinc.com/images/support/customer_service_conference_2010-ec135.pdf>.

* cited by examiner

MAST SPACE OF HELICOPTER, DRIVING POWER TRANSMISSION DEVICE OF HELICOPTER INCLUDING MAST SPACER, AND HELICOPTER

CROSS-REFERENCE TO RELATED APPLICATIONS

This application is a National Stage application of PCT Application No. PCT/JP2016/004882 filed Nov. 15, 2016, which in turn is based on and claims priority to Japanese Patent Application No. 2015-227383 filed on Nov. 20, 2015. The contents of the above applications are incorporated herein by reference in their entirety.

TECHNICAL FIELD

The present invention relates to a mast spacer disposed between a mast bearing and a mast nut in a driving power transmission device of a helicopter, the driving power transmission device of the helicopter including this mast spacer, and the helicopter.

BACKGROUND ART

A main rotor of a helicopter rotates by driving power transmitted from an engine via a driving power transmission device. The main rotor includes a plurality of blades secured to a hub provided at a first end (one end) of a main shaft, and a second end (the other end) of the main shaft is supported by a main gear box included in the driving power transmission device in such a manner that the main shaft is rotatable. The driving power transmission device is provided with a mast bearing for supporting the main shaft in such a manner that the main shaft is rotatable. In a known configuration, the driving power transmission device includes a mast spacer disposed between the mast bearing and the mast nut to fix the mast bearing in an axial direction.

The mast spacer has a cylindrical shape covering the outer periphery of the main shaft. In a case where it is assumed that a portion of the main shaft which is closer to the hub (on the first end side) is an upper side and a portion of the main shaft which is closer to the main gear box (on the second end side) is a lower side, the upper portion of the mast spacer is in contact with the lower portion of the mast bearing. The lower portion of the mast spacer is in contact with a shaft sleeve. The lower portion of the shaft sleeve is fastened by use of the mast nut. By fastening the mast nut in an upward direction (from the lower side toward the upper side), the position of the mast bearing from the lower side toward the upper side is defined by the mast spacer. Thus, the position of the mast bearing in the axial direction of the main shaft is fixed by the mast spacer.

An exemplary mast spacer serves to fix the axial position of the mast bearing and suppress a creep of the mast bearing. In general, the creep is a phenomenon in which a bearing inner race slides (slips) and rotates relative to the main shaft, due to a radial load exerted on a bearing.

To avoid this, for example, projections protruding from the upper surface of the mast bearing are provided at the upper end of the both ends of the mast spacer, and recesses to which the projections are fittable are provided in the lower surface of a bearing inner race. In addition, similarly, projections are provided at the lower end of the mast spacer and recesses to which the projections are fittable are provided in the shaft sleeve. In this configuration, the upper portion of the mast spacer and the lower portion of the mast bearing mesh with each other, and the lower portion of the mast spacer and the shaft sleeve mesh with each other. As a result, occurrence of the creep can be suppressed.

If a great bending deformation of the main shaft occurs, a gap (clearance) is formed between the main shaft and the mast spacer, and a relative motion (movement) between the main shaft and the mast spacer occurs. This results in an abrasion (wear) occurring in the end surface or the projections of the mast spacer, as disclosed in Non-patent Literatures 1 and 2. To avoid occurrence of the abrasion, Patent Literature 1 discloses a bellows-like buffering structure (bellows section) provided at the upper portion of the mast spacer. By providing such a buffering structure, it becomes possible to prevent formation of a gap between the main shaft and mast spacer. In this way, occurrence of the abrasion (wear) in the end surface or the projections of the mast spacer can be effectively suppressed.

CITATION LIST

Patent Literature

Patent Literature 1: German Patent Application Publication No. 102012203178 specification
Non-patent Literature 1: Eurocopter EC135 Technical Briefing, Heli-Expo, Houston, February 2010, [retrieved on Apr. 22, 2015], Internet <URL:http://airbushelicoptersinc.com/images/support/TechBriefings2010/EC135-tech-briefing-Heli-Expo-4-12-2010.pdf>
Non-patent Literature 2: Eric Herbst, Customer Service Symposium $CS^3$, EC135, Oct. 5, 2010, [retrieved on Apr. 22, 2015], Internet <URL:http://airbushelicoptersinc.com/images/support/customer_service_conference_20-10-ec135.pdf>

SUMMARY OF INVENTION

Technical Problem

However, in the above-described configuration in which the buffering structure such as the bellows section is provided at the upper portion of the mast spacer, an excessive stress is generated in the bellows section. For this reason, it is necessary to properly adjust the amount of contraction of the bellows section in a case where the driving power transmission device is assembled. Since the amount of contraction of the bellows section is adjusted depending on a degree to which the mast nut is fastened, a very precise adjustment work is required to fasten the mast nut. As a result, an assembly work of the driving power transmission device becomes significantly complicated.

The bellows section is provided with grooves (innere radiale Nur 24 and aeussere radiale Nut 26) arranged alternately on the inner surface side and outer surface side of the mast spacer and has a configuration in which a large-diameter portion and a small-diameter portion are connected to each other continuously. In this configuration, the outer diameter of the upper portion of the mast spacer is excessively large. Therefore, there is a need for a space which is wide in a radial direction, in a location corresponding to the upper portion of the mast spacer. As a result, it becomes necessary to change the design of the support structure for the main shaft in the main gear box. In addition, formation of compact support structure is adversely affected.

The present invention has been developed to solve the above described problem, and an object of the present invention is to provide a mast spacer which makes it possible to avoid complexity of an assembly work and suppress an abrasion (wear) in the end surface or projections of the mast spacer without significantly changing a support structure for a main shaft.

Solution to Problem

To achieve the above-described object, according to the present invention, there is provided a mast spacer disposed between a mast bearing and a mast nut in a main shaft of a helicopter, the mast spacer comprising: a cylindrical body, a first end of the mast spacer being a bearing contact end which is fittable to an inner race of the mast bearing, the cylindrical body being provided with a slit penetrating a side wall of the cylindrical body, and the slit having a linear shape crossing an axial direction of the cylindrical body.

In accordance with this configuration, the bearing contact end of the mast spacer is configured to be fittable to the mast bearing, and the body of the mast spacer is provided with the slit. This structure makes it possible to suppress occurrence of a creep of the mast bearing by fitting the bearing contact end to the mast bearing. In addition, the slit serves as a buffering structure to suppress formation of a gap between the main shaft and the mast spacer. Since the slit is formed to penetrate the side wall of the body, it becomes possible to avoid a situation in which the outer diameter of the mast spacer is excessively increased, which occurs in the conventional bellows section. As a result, an abrasion (wear) in the end surface of the bearing contact end or the fitting structure can be excessively suppressed without significantly changing the support structure for the main shaft.

The mast nut is fastened in the axial direction of the cylindrical body. Therefore, as fastening of the mast nut progresses, the dimension of the hollow portions of the slits is reduced, and the mast nut can be fastened to an extent that the hollow portions of the slits finally cease to exist. In other words, the upper limit of fastening the mast nut is defined as a location in a state in which the hollow portions of the slits cease to exist. In a case where the driving power transmission device is assembled, an operator has only to fasten the mast nut to an extent that the hollow portions of the slits cease to exist. This can eliminate a need for precise adjustment work for fastening the mast nut, which is necessary for the conventional mast spacer including the bellows section. As a result, complexity of the assembly work for the driving power transmission device can be avoided.

In the mast spacer having the above-described configuration, the slit may have a straight-line shape or a shape including a curve line.

In the mast spacer having the above-described configuration, the bearing contact end may include a projection which is fittable to a recess provided in the inner race of the mast bearing, as a fitting structure which is fittable to the inner race of the mast bearing.

In the mast spacer having the above-described configuration, a second end of the mast spacer may be a sleeve contact end which is fittable to a stepped portion provided in an inner peripheral surface of a shaft sleeve.

In the mast spacer having the above-described configuration, the sleeve contact end may include a projection which is fittable to a recess provided in the stepped portion of the shaft sleeve, as a fitting structure which is fittable to the stepped portion of the shaft sleeve.

In the mast spacer having the above-described configuration, the bearing contact end may include a projection which is fittable to a recess provided in the inner race of the mast bearing so that the bearing contact end is fittable to the inner race of the mast bearing.

In the mast spacer having the above-described configuration, the slit may be provided in the cylindrical body in a location that is closer to the bearing contact end.

According to the present invention, a driving power transmission device of a helicopter, comprises the mast spacer having the above-described configuration, wherein in a case where a portion of the main shaft which is supported in such a manner that the main shaft is rotatable is a supported part, a portion of the main shaft which is closer to the supported part is a lower side, and a portion of the main shaft which is secured to a hub is an upper side, the mast spacer fixedly places the mast bearing in a location which is an upper portion of the supported part, by fastening the mast nut in an upward direction (from the lower side toward the upper side).

Furthermore, the present invention comprises the helicopter including the driving power transmission device having the above-described configuration. In other words, the helicopter of the present invention may include the driving power transmission device including the mast spacer having the above-described configuration in the support structure for the main shaft.

Advantageous Effects of Invention

The present invention has advantages in that with the above-described configuration, it becomes possible to provide a mast spacer which makes it possible to avoid complexity of an assembly work and effectively suppress occurrence of an abrasion in the end surface or projections of the mast spacer without significantly changing a support structure for a main shaft.

DESCRIPTION OF EMBODIMENTS

Now, preferred embodiment of the present invention will be described with reference to the drawings. Hereinafter, throughout the drawings, the same or corresponding constituents are designated by the same reference symbols and will not be described in repetition.

[Support Structure for Main Shaft]

Initially, a driving power transmission device included in a helicopter, a main gear box included in the driving power transmission device, a main shaft supported by the main gear box, and a mast spacer according to the present embodiment included in a support structure for the main shaft will be specifically described with reference to FIGS. 1 and 2. FIG. 2 shows in an enlarged manner, a region surrounding the support structure for the main shaft, of the main gear box included in the driving power transmission device.

Figure 1:
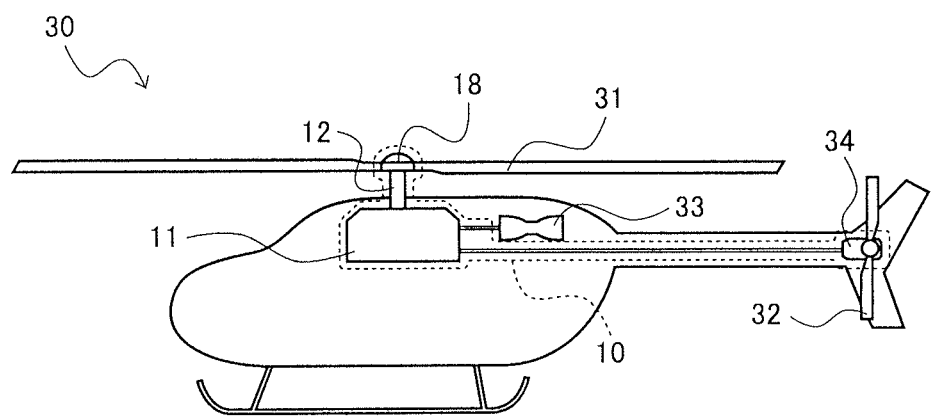
FIG. 1 is a view showing the schematic configuration of a helicopter including a mast spacer and a driving power transmission device according to the embodiment of the present invention.
Figure 2:
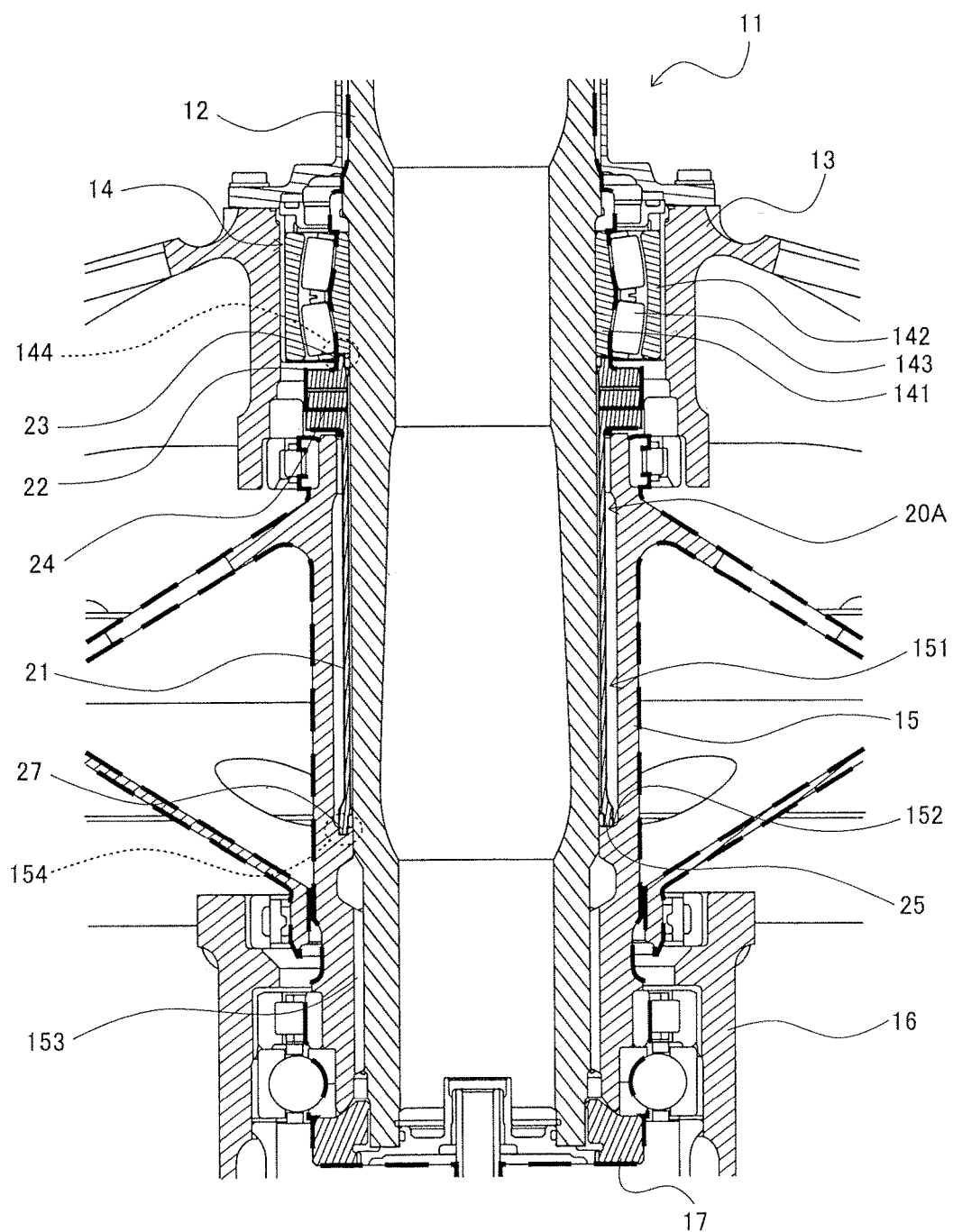
FIG. 2 is a schematic cross-sectional view showing a support structure for a main shaft, in a main gear box included in the driving power transmission device of the helicopter according to the embodiment of the present invention.

As schematically shown in FIG. 1, a helicopter 30 according to the present embodiment includes a main rotor 31, a tail rotor 32, an engine 33, and a driving power transmission device 10. Driving power is transmitted from the engine 33 to the main rotor 31 and the tail rotor 32 via the driving power transmission device 10. The driving power transmission device 10 includes a main gear box 11. The main gear box 11 supports a main shaft 12 which is the rotary shaft of the main rotor 31. The first end (one end) of the main shaft 12 is supported by the main gear box 11. A hub 18 is provided at the second end (the other end) of the main shaft 12. Blades (rotor blades or rotary wings) of the main rotor 31 are secured to the hub 18.

As schematically shown in FIG. 1, typically, a portion of the main shaft 12 which is on the second end side (closer to the second end) is exposed from the main gear box 11 (driving power transmission device 10), and a portion of the main shaft 12 which is on the first end side (closer to the first end) is supported inside the main gear box 11. For easier description, a portion of the main shaft 12 which is supported by the main gear box 11 will be referred to as a "supported part." For easier description, it is also supposed that a portion of the main shaft 12 which is on the supported part side (closer to the supported part) is a lower side and a portion of the main shaft 12 which is secured to the hub 18 is an upper side.

As shown in FIG. 2, the support structure for the main shaft 12 in the main gear box 11 includes an upper bearing section 13, a mast bearing 14, a shaft sleeve 15, a lower bearing section 16, and a mast nut 17. FIG. 2 shows in an enlarged manner the supported part of the main shaft 12. A mast spacer 20A according to the present embodiment is disposed between the mast bearing 14 and the mast nut 17. The mast spacer 20A is configured to fixedly place the mast bearing 14 in a predetermined position in the axial direction of the main shaft 12.

The upper bearing section 13 supports the peripheral surface of the upper portion of the supported part of the main shaft 12 in such a manner that the main shaft 12 is rotatable, in the main gear box 11 As shown in FIG. 2, the upper bearing section 13 includes the mast bearing 14. The mast bearing 14 includes a bearing inner race 141 and a bearing outer race 142. Between the bearing inner race 141 and the bearing outer race 142, a plurality of rolling elements 143 are rotatably retained. In the example of FIG. 2, the rolling elements 143 are rollers, and therefore, the mast bearing 14 according to the present embodiment is a roller bearing. However, the present invention is not limited to this. The mast bearing 14 may be a ball bearing or other bearings.

The bearing outer race 142 of the mast bearing 14 is vertically movable relative to the inner surface of the upper bearing section 13. The bearing inner race 141 of the mast bearing 14 is in contact with the peripheral surface of the upper portion of the supported part of the main shaft 12. The bearing outer race 142 is in contact with the inner peripheral surface of the upper bearing section 13. A plurality of recesses 144 (portion surrounded by a dotted line) are provided in the lower surface of the bearing inner race 141.

The lower portion of the shaft sleeve 15 is coupled to the main shaft 12 by a spline coupling 153. This allows the main shaft 12 and the shaft sleeve 15 to rotate at an equal rotational speed. In the configuration of FIG. 2, the lower portion of the upper bearing section 13 and the upper portion of the shaft sleeve 15 overlap with each other. An auxiliary bearing is provided in an overlap region of the lower portion of the upper bearing section 13 and the upper portion of the shaft sleeve 15. The mast spacer 20A with a cylindrical shape is externally mounted on a region of the peripheral surface of the supported part of the main shaft 12, the region extending from the lower portion of the upper bearing section 13 to a substantially upper-half portion of the shaft sleeve 15. In other words, the mast spacer 20A with a cylindrical shape is disposed to cover the peripheral surface of the intermediate (middle) portion of the supported part of the main shaft 12. The lower portion of the upper bearing section 13 is located on the outer side of the upper portion of the mast spacer 20A. The shaft sleeve 15 is located on the outer side of the intermediate portion and lower portion of the mast spacer 20A.

The mast spacer 20A includes a cylindrical spacer body 21. The upper end of the mast spacer 20A is a bearing contact end 22 which is in contact with the bearing inner race 141. The inner peripheral surface of the shaft sleeve 15 is formed with a spacer accommodating space 151 in which a most part of the mast spacer 20A is accommodated. A stepped portion 152 facing in the upward direction is provided in the intermediate portion of the inner peripheral surface of the shaft sleeve 15. In this configuration, the lower end of the mast spacer 20A is in contact with the stepped portion 152 provided at the inner peripheral surface of the shaft sleeve 15. Therefore, the lower end of the mast spacer 20A is a sleeve contact end 25 which is contact with the shaft sleeve 15. The stepped portion 152 is provided with a plurality of recesses 154 (portion surrounded by a dotted line). This allows the main shaft 12 and the mast spacer 20A to rotate at an equal rotational speed.

The bearing contact end 22 of the mast spacer 20A is provided with a plurality of projections 23 on an upper surface thereof. Likewise, the sleeve contact end 25 of the mast spacer 20A is provided with a plurality of projections 27. The plurality of projections 23 are fitted to the plurality of recesses 144, respectively, provided in the lower surface of the bearing inner race 141. The plurality of projections 27 are fitted to the plurality of recesses 154, respectively, provided in the stepped portion 152 of the shaft sleeve 15. In this configuration, the bearing inner race 141 of the mast bearing 14 is restricted in a rotational direction with respect to the main shaft 12. Therefore, the bearing inner race 141 is supported by the mast spacer 20A while inhibiting the bearing inner race 141 from rotating relative to the main shaft 12. As a result, occurrence of a creep of the bearing inner race 141 can be effectively suppressed, as will be described later.

For easier description, the projections 23 provided at the bearing contact end 22 will be referred to as "bearing projections 23", while the projections 27 provided at the sleeve contact end 25 will be referred to as "sleeve projections 27". Likewise, the recesses 144 provided in the bearing inner race 141 will be referred to as "inner race recesses 144", while the recesses 154 provided in the stepped portion 152 of the shaft sleeve 15 will be referred to as "stepped portion recesses 154".

The lower bearing section 16 is provided to cover the outer peripheral surface of the lower portion of the shaft sleeve 15. Therefore, the peripheral surface of the lower portion of the supported part of the main shaft 12 is supported by the lower bearing section 16. A plurality of bearings are provided between the lower bearing section 16 and the shaft sleeve 15. The specific configuration of the upper bearing section 13 and the specific configuration of the lower bearing section 16 are not particularly limited so long as the upper bearing section 13 has a known configuration for supporting the main shaft 12 and the lower bearing section 16 has a configuration for supporting the shaft sleeve 15. For example, between the upper bearing section 13 and the shaft sleeve 15, and between the lower bearing section 16 and the shaft sleeve 15, rolling bearings such as auxiliary ball bearings or roller bearings, or slide bearings may be provided instead of the rolling bearings.

As described above, the support structure for the main shaft 12 includes the upper bearing section 13 and the mast bearing 14, and the lower bearing section 16, which are arranged in this order from the top (from the hub 18 side). These constituents of the support structure are fastened in the upward direction from the lowermost portion, by use of the mast nut 17. As shown in FIG. 2, the mast nut 17 is fastened in a state in which the mast nut 17 is fitted to the peripheral surface of the end portion of the supported part of the main shaft 12, at the lower end portion (end portion where the hub 18 is not provided) of the main shaft 12. In this support structure, the constituents indicated by bold broken lines in FIG. 2 (the main shaft 12, the bearing inner race 141 of the mast bearing 14, the inner race of the lower portion of the upper bearing section 13, the mast spacer 20A, the shaft sleeve 15, the inner race of the lower bearing section 16, and the mast nut 17) rotate at an equal rotational speed.

The lower end of the shaft sleeve 15 is located just above the mast nut 17. A part of the bearing of the lower bearing section 16 is also located just above the mast nut 17. As described above, the position of the lower end (sleeve contact end 25) of the mast spacer 20A is defined by contact with the upper side of the stepped portion 152 of the shaft sleeve 15, and the bearing inner race 141 of the mast bearing 14 is secured to the upper end (bearing contact end 22) of the mast spacer 20A. Therefore, in a state in which the mast nut 17 is fastened in the upward direction (from the lower side toward the upper side), a load generated by fastening the mast nut 17 is applied to the shaft sleeve 15, the mast spacer 20A, and the mast bearing 14, which are disposed above the mast nut 17. Therefore, by firmly fastening the mast nut 17 in the upward direction (toward the upper side), the position of the mast bearing 14 in the axial direction of the main shaft 12 can be defined, in the supported part of the main shaft 12.

Note that the support structure for the main shaft 12 is not limited to the structure including the upper bearing section 13, the mast bearing 14, the shaft sleeve 15, the lower bearing section 16, and the mast nut 17, shown in FIG. 2. The support structure for the main shaft 12 may include constituents other than the upper bearing section 13, the mast bearing 14, the shaft sleeve 15, the lower bearing section 16, and the mast nut 17. Although in the example of FIG. 2, the upper end of the mast spacer 20A is in contact with the mast bearing 14 and the lower end of the mast spacer 20A is in contact with the shaft sleeve 15, other configuration may be used so long as the mast spacer 20A is disposed between the mast bearing 14 and the mast nut 17 in the main shaft 12, and the upper end of the mast spacer 20A is the bearing contact end 22. The supported part of the main shaft 12 and the above-described support structure (including the mast spacer 20A) for supporting the supported part constitute a "shaft support structure".

[Configuration of Mast Spacer]

Next, the specific configuration of the mast spacer 20A and the specific configuration of a modified example of the mast spacer 20A will be described with reference to FIGS. 3A and 3B and FIGS. 4A and 4B, in addition to FIG. 2.

Figure 3A:
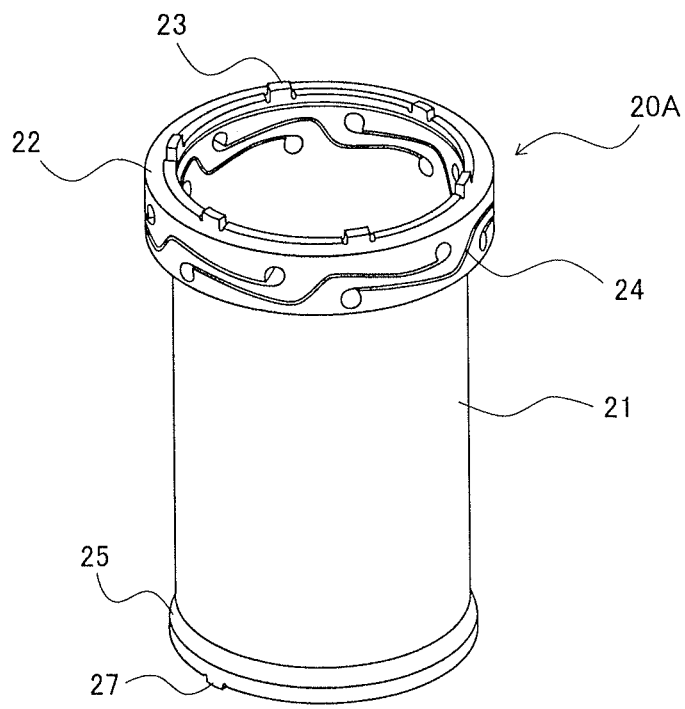
FIG. 3A is a schematic perspective view showing an example of the configuration of the mast spacer according to the embodiment of the present invention, which is used in the support structure for the main shaft of FIG. 2.
Figure 3B:
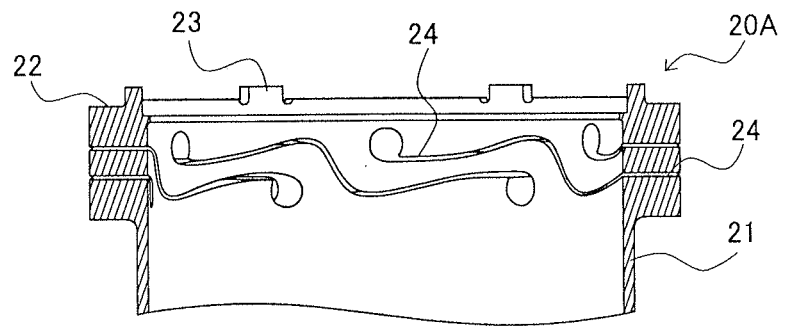
FIG. 3B is a schematic cross-sectional view showing the upper portion of the mast spacer of FIG. 3A.

As described above, the mast spacer 20A includes the cylindrical spacer body 21, the upper end (first end) of the mast spacer 20A is the bearing contact end 22 which is in contact with the mast bearing 14, and the lower end (second end) of the mast spacer 20A is the sleeve contact end 25 which is in contact with the shaft sleeve 15. The bearing contact end 22 is provided with the plurality of bearing projections 23 protruding in the upward direction. The sleeve contact end 25 is provided with the sleeve projections 27 protruding in the downward direction. Further, in the present embodiment, as shown in FIGS. 3A and 3B, spiral slits 24 penetrating a side wall are provided in the spacer body 21 in a location which is in the vicinity of the bearing contact end 22.

The spiral slits 24 are cuts penetrating the side wall of the spacer body 21 and having a linear shape and a width (or linear punching holes). The lengthwise direction of the spiral slits 24 may cross the axial direction of the cylindrical spacer body 21. In other words, the spiral slits 24 may extend in the circumferential direction of the mast spacer 20A. Although in the present embodiment, the lengthwise direction of the spiral slits 24 is substantially perpendicular to the axial direction of the cylindrical spacer body 21, the configuration is exemplary. For example, the lengthwise direction of the spiral slits 24 may be inclined with respect to the direction perpendicular to the axial direction of the cylindrical spacer body 21.

The width of the spiral slits 24, namely the cut width of the side wall of the spacer body 21 is not particularly limited. The spiral slits 24 serve to suppress formation of a gap (clearance) between the main shaft 12 and the mast spacer 20A, in a case where bending deformation of the main shaft 12 occurs. For this reason, depending on conditions including the degree of bending deformation of the main shaft 12, the specific support structure for the main shaft 12, the magnitude of a radial load generated by the bending deformation, etc., the dimension of the gap formed between the main shaft 12 and the mast spacer 20A is varied. Therefore, the width of the spiral slits 24 is not particularly limited, and may be suitably set depending on an assumed dimension of the gap.

In the present embodiment, the bearing projections 23 of the mast spacer 20A are fitted to the inner race recesses 144, respectively, of the bearing inner race 141. In this case, to suppress an abrasion (wear) of the bearing projections 23, the width of the spiral slits 24 can be set to a value smaller than the height of the bearing projections 23 (the dimension of the projections). As described above, during assembly, the mast nut 17 can be fastened until the hollow portions of the spiral slits 24 ceases to exist (the width becomes substantially zero). In this case, if a total of the amount of the axial sliding of the bearing projections 23 due to the bending deformation of the main shaft 12 and the amount of the axial sliding of the sleeve projections 27 due to the bending deformation of the main shaft 12 is less than the width of the spiral slits 24, the abrasion of the bearing projections 23 (or the abrasion of the bearing contact end 22 of the mast spacer 20A) can be effectively suppressed.

The length of the spiral slits 24 is not particularly limited. As described above, the spiral slits 24 are cuts penetrating the side wall. If the length of the spiral slits 24 is excessively large, the spiral slits 24 cut a part of the spacer body 21 in a transverse direction. To keep the shape and strength of the spacer body 21, for example, the length of the spiral slits 24 may be equal to or less than the half of the length in the circumferential direction of cylindrical spacer body 21. Although in the example of FIGS. 3A and 3B, the plurality of spiral slits 24 are arranged in one line in the circumferential direction, the arrangement of the spiral slits 24 is not limited to this, and may be chosen depending on the conditions.

In the present embodiment, as shown in FIGS. 3A and 3B, one spiral slit 24 has a spiral shape in which large openings are provided at the both ends and a linear portion includes two curved portions. The specific configuration of the spiral shape is not limited to this so long as the spiral slit 24 has an elongated shape including a curved portion. For example, the large openings at the both ends are provided so that a machining tool can be placed to penetrate the side wall of the spacer body 21. The spiral slit 24 may not have the openings at the both ends.

Although in the present embodiment, the spiral slits 24 are located in a region of the spacer body 21, the region being closer to the bearing contact end 22, the present invention is not limited to this, and the spiral slits 24 may be provided in any location of the spacer body 21. Although in the present embodiment, the side wall of a portion of the spacer body 21 which is in the vicinity of the bearing contact end 22 has a thickness larger than that of the remaining portion of the spacer body 21, the present invention is not limited to this, and the thickness of the side wall of a portion of the spacer body 21 which is in the vicinity of the bearing contact end 22 may be equal to that of the remaining portion of the spacer body 21. As shown in FIG. 2, the thickness of the side wall of a portion of the spacer body 21 which is in the vicinity of the sleeve contact end 25 is larger than that of the remaining portion of the spacer body 21, although this thickness is not so large as that of a portion of the spacer body 21 which is in the vicinity of the bearing contact end 22. However, this thickness may also be equal to that of the remaining portion of the spacer body 21.

In the present embodiment, as described above, by fastening the mast nut 17, a load is applied to the mast spacer 20A in the upward direction (from the lower side of the mast spacer 20A toward the upper side of the mast spacer 20A). Therefore, to increase the strength of the both end surfaces of the mast spacer 20A, the thicknesses of the side walls of the portions of the spacer body 21 which are in the vicinity of the both ends are preferably larger than that of the remaining portion of the spacer body 21.

Since the load is applied to the mast spacer 20A in the upward direction (from the lower side of the mast spacer 20A toward the upper side of the mast spacer 20A), the application direction of the load conforms to the axial direction of the cylindrical spacer body 21 of the mast spacer 20A. The spiral slits 24 are formed to extend along the circumferential direction to cross the axial direction of the cylindrical spacer body 21. For this reason, in some cases, the strength of the portions of the spacer body 21 which are formed with the spiral slits 24 is lower than that of the remaining portion of the spacer body 21. In view of this, the thickness of the side wall of the portion of the spacer body 21 which is formed with the spiral slits 24 is increased to suppress reduction of strength.

In the present embodiment, the spiral slits 24 are formed in the portion of the spacer body 21 which is in the vicinity of the bearing contact end 22, and hence the thickness of the upper end portion of the spacer body 21 which is in the vicinity of the bearing contact end 22 is larger. However, the present invention is not limited to this. For example, in a case where the spiral slits 24 are formed in the intermediate portion of the spacer body 21, the thickness of the side wall of this intermediate portion may be increased. In a case where the spiral slits 24 are formed in the lower end portion of the spacer body 21 (a portion of the spacer body 21 which is in the vicinity of the sleeve contact end 25), the thickness of the side wall of a portion of the spacer body 21 which is in the vicinity of the lower end may be increased.

The upper end portion of the mast spacer 20A is located in the overlap region of the upper bearing section 13 and the shaft sleeve 15. In a region which is in the vicinity of this overlap region, design change can be easily made, by, for example, increasing the dimension of the mast spacer 20A in a radial direction (the bellows section of the conventional configuration is provided at the upper end portion of the mast spacer). In view of this, the spiral slits 24 are preferably provided at the upper end portion of the mast spacer 20A, namely, a portion of the mast spacer 20A which is the vicinity of the bearing contact end 22.

Figure 4A:
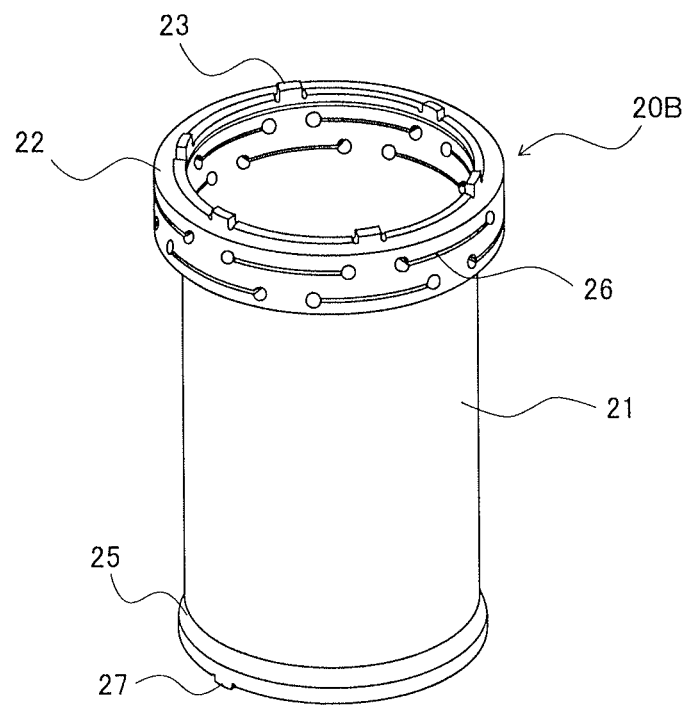
FIG. 4A is a schematic perspective view showing another example of the configuration of the mast spacer according to the embodiment.
Figure 4B:
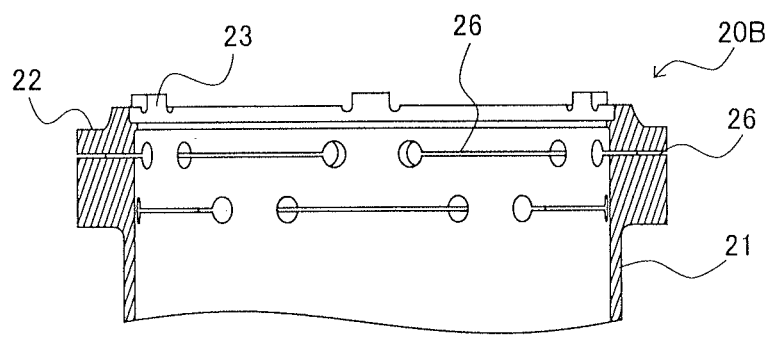
FIG. 4B is a schematic cross-sectional view showing the upper portion of the mast spacer of FIG. 4A.

The slits provided in the mast spacer 20A are not limited to the spiral slits 24 shown in FIGS. 3A and 3B so long as the slits are linear cuts penetrating the side wall of the spacer body 21, and are formed to cross the axial direction of the cylindrical spacer body 21. In another example of the slits, for example, as shown in FIGS. 4A and 4B, a mast spacer 20B has linear (straight-line) slits 26. Unlike the spiral slits 24, the linear slits 26 do not include a curve line, and are formed in a straight-line shape extending along the circumferential direction of the spacer body 21.

The specific configuration of the linear slits 26 is not particular limited, and the degree of inclination with respect to the axial direction of the cylindrical spacer body 21, the cut width of the side wall, the length, the arrangement, the location, the shape, the thickness of the side wall where the linear slits 26 are formed, or the like can be suitably set, depending on the conditions, as in the case of the above-described spiral slits 24. In the example of FIGS. 4A and 4B, the linear slits 26 have a linear (straight-line) shape in which they extend in the direction perpendicular to the axial direction of the cylindrical spacer body 21. Alternatively, the linear slits 26 may be inclined, may be formed in a broken line shape, or may partially include a curved line. In addition, the linear slits 26 may not have the openings at the both ends, as in the case of the spiral slits 24.

In either the spiral slits 24 or the linear slits 26, in a case where a plurality of slits are arranged in the circumferential direction, they are preferably arranged so that at least circumferential portions of the upper and lower slits overlap with each other in a vertical direction, instead of arranging the cuts in one line in the circumferential direction. This makes it possible to well keep the shape and strength of the spacer body 21 and increase a spacing (hollow portion) of contraction in the axial direction of the cylindrical spacer body 21.

For example, in the mast spacer 20A of FIGS. 3A and 3B, the end portions of the spiral slits 24 extend in the direction substantially perpendicular to the axial direction of the cylindrical spacer body 21 (substantially along the circumferential direction), and overlap with each other in the vertical direction. In contrast, the intermediate portions of the spiral slits 24 are inclined with respect to the axial direction of the cylindrical spacer body 21 (and the circumferential direction), and do not overlap with each other. Likewise, in the example of FIGS. 4A and 4B, the plurality of linear slits 26 are arranged in two lines in the vertical direction and have a staggered arrangement (zigzag arrangement). Specifically, the locations of the upper and lower linear slits 26 are deviated from each other. For example, one linear slit 26 at the lower side is disposed in a location where two linear slits 26 at the upper side are adjacent to each other.

In the mast spacer 20A, 20B configured as described above, by fastening the mast nut 17 in the upward direction (from the lower side toward the upper side) in the shaft support structure (structure including the main shaft 12, the upper bearing section 13, the mast bearing 14, the shaft sleeve 15, the lower bearing section 16, the mast nut 17, the mast spacer 20A, 20B, and the like), the mast spacer 20A, 20B allows the mast bearing 14 to be fixedly placed in the position which is the upper portion of the supported part of the main shaft 12. The bearing contact end 22 of the mast spacer 20A, 20B having the bearing projections 23 are fittable to the bearing inner race 141. This makes it possible to effectively suppress occurrence of a creep in the mast bearing 14.

In the present embodiment, as described above, the bearing contact end 22 of the mast spacer 20A, 20B has the bearing projections 23 which are fittable to the inner race recesses 144, respectively, provided in the bearing inner race 141, and thus is fittable to the mast bearing 14. Likewise, the sleeve contact end 25 of the mast spacer 20A, 20B has the sleeve projections 27 which are fittable to the stepped portion recesses 154, respectively, provided in the stepped portion 152 of the inner peripheral surface of the shaft sleeve 15, and thus is fittable to the shaft sleeve 15. The specific configuration of the bearing contact end 22 is not limited to the configuration including the bearing projections 23 and the specific configuration of the sleeve contact end 25 is not limited to the configuration including the sleeve projections 27 so long as each of the bearing contact end 22 and the sleeve contact end 25 has a fitting structure which is fittable to the associated constituent (the bearing inner race 141 or the stepped portion 152).

Examples of the fitting structure of the mast bearing 14 and the bearing contact end 22 will be described. The bearing inner race 141 may be provided with the projections and the bearing contact end 22 of the mast spacer 20A, 20B may be provided with the recesses which are fittable to the projections, respectively. The shape of the bearing contact end 22 and the shape of the bearing inner race 141 may be formed so that they are fittable to each other. An auxiliary member may be provided to allow the bearing contact end 22 and the bearing inner race 141 to be fittable to each other. The fitting structure of the stepped portion 152 of the shaft sleeve 15 and the sleeve contact end 25 of the mast spacer 20A, 20B may be configured in the same manner.

[Occurrence of Abrasion or the Like in Mast Spacer and Suppressing Occurrence of Abrasion]

Next, occurrence of an abrasion in the bearing projections 23 or the upper surface of the bearing contact end 22 in the conventional mast spacer, and suppressing the abrasion in the mast spacer 20A, 20B of the present embodiment will be specifically described with reference to FIGS. 5A and 5B, and FIGS. 6A and 6B. Although FIGS. 5B, 6A, and 6B show the mast spacer 20A of FIGS. 3A and 3B, the abrasion can be suppressed in the same manner in the mast spacer 20B of FIGS. 4A and 4B, of course.

Figure 5A:
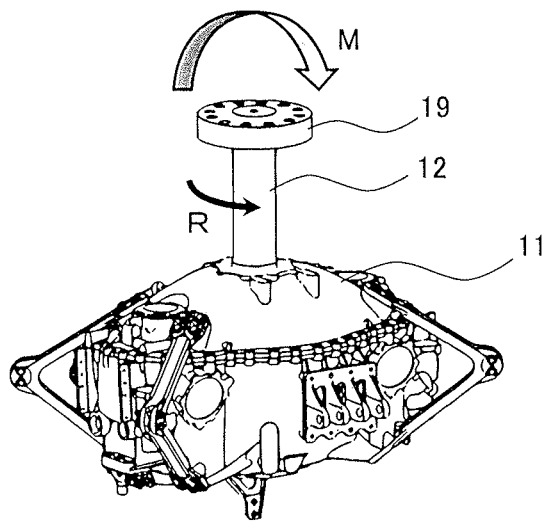
FIG. 5A is a schematic view showing the main gear box whose major constituents are shown in FIG. 2 and the rotational direction and moment of the main shaft supported by the main gear box.

As shown in FIG. 5A, a portion (supported part) on the lower end side, of the main shaft 12 is supported by the main gear box 11 of the driving power transmission device 10 (see FIG. 2), and the upper end of the main shaft 12 is provided with a flange 19 to mount and fasten the hub 18 (not shown in FIG. 5A) to the main shaft 12. As shown in FIGS. 5A and 5B, in a case where the rotational direction of the main shaft 12 is an arrow R direction, a mast moment occurs in a block arrow M direction, in the supported part of the main shaft 12. As shown in FIG. 5B, for example, a radial load is applied in the direction of a block arrow L1 (direction from the right to the left in FIG. 5B) to the supported part of the main shaft 12 in a location corresponding to the mast bearing 14 (upper bearing section 13). In contrast, a radial load is applied in the direction of a block arrow L2 that is opposite to the direction of the block arrow L1, to the supported part of the main shaft 12 in a location corresponding to the lower bearing section 16.

Figure 5B:
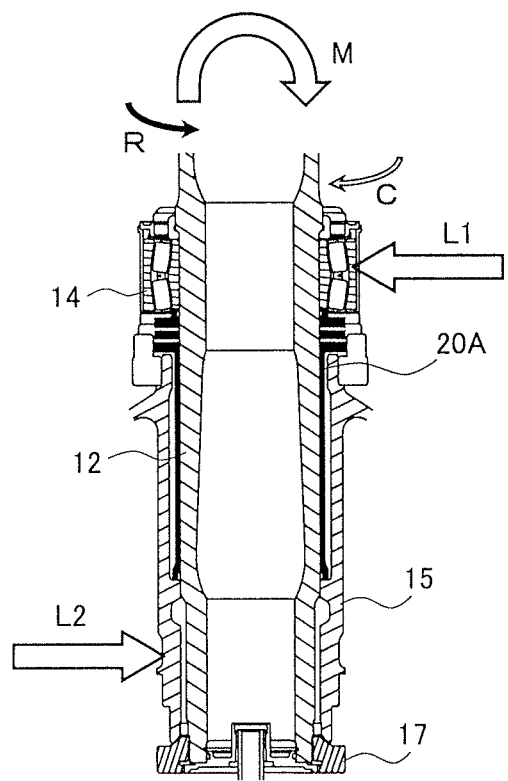
FIG. 5B is a schematic view for explaining occurrence of a creep and a radial load in the main shaft of FIG. 5A.
Figure 6A:
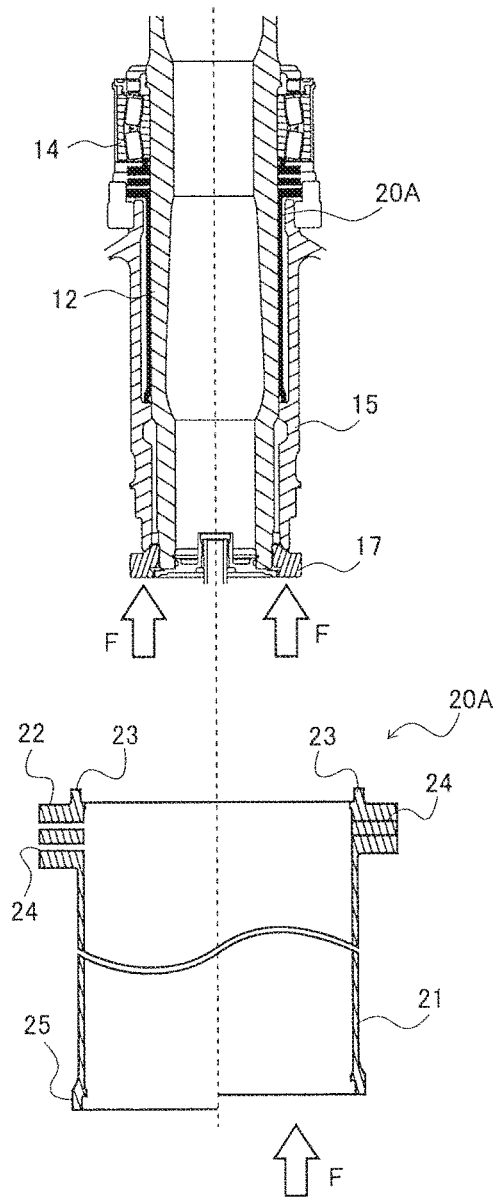
FIG. 6A is a schematic view for explaining a state in which the mast nut is fastened by use of the mast spacer of FIG. 3.
Figure 6B:
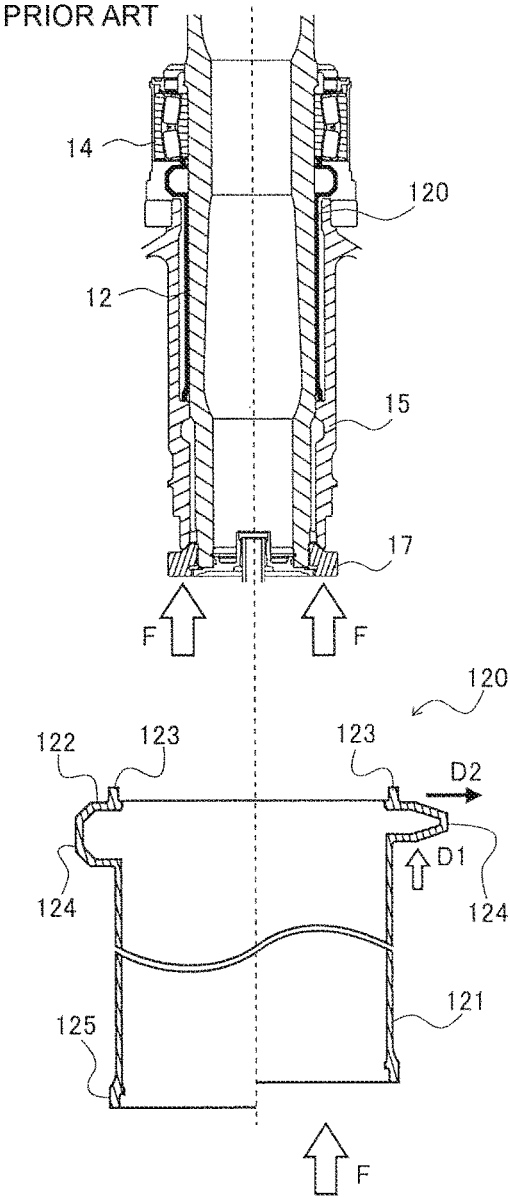
FIG. 6B is a schematic view for explaining a state in which the mast nut is fastened by use of a conventional mast spacer having a bellows section.

In a case where the radial load is applied to the supported part of the main shaft 12, as described above, the bearing inner race 141 of the mast bearing 14 rotates in a direction indicated by a white arrow C in FIG. 5B, relative to the main shaft 12. This relative rotation is the creep. To suppress the creep, the bearing inner race 141 is engaged with the bearing contact end 22 of the mast spacer 20A (the bearing projections 23 provided at the upper surface of the mast spacer 20A are fitted to the inner race recesses 144, respectively, provided in the lower surface of the bearing inner race 141.

If the bending deformation of the main shaft 12 occurs to a great degree, it is likely that a gap (clearance) is formed between the bearing inner race 141 of the mast bearing 14 and the mast spacer 20A, and a relative movement (motion) between the bearing inner race 141 and the mast spacer 20A occurs. Unless the relative movement of the mast spacer 20A is sufficiently suppressed, an abrasion occurs in the bearing projections 23 of the mast spacer 20A or the bearing contact end 22 of the mast spacer 20A.

To avoid this, in the present embodiment, as shown in FIGS. 5B and 6A, the mast spacer 20A is provided with the spiral slits 24. Therefore, even if bending deformation of the main shaft 12 occurs to an extent that a gap (clearance) is formed between the bearing inner race 141 of the mast bearing 14 and the mast spacer 20A, formation of the gap can be suppressed by a buffering action of the spiral slits 24. As a result, the relative movement of the mast spacer 20A can be suppressed, and an abrasion of the bearing projections 23 or the upper surface of the bearing contact end 22 can be effectively suppressed.

As described above, in the present embodiment, the spiral slits 24 are formed as the cuts penetrating the side wall of the spacer body 21. In a case where a fastening load is exerted in a block arrow F direction by fastening the mast nut 17 as shown in FIG. 6A, this fastening load works from the lower end (sleeve contact end 25) of the mast spacer 20A toward the upper end (bearing contact end 22) of the mast spacer 20A. If the fastening load is exerted to an extent that the hollow portions of the spiral slits 24 cease to exist, the mast nut 17 cannot be fastened any more. In other words, the spiral slits 24 serve as a stopper structure for suppressing excessive fastening of the mast nut 17 as well as the buffering structure for suppressing the relative movement of the mast spacer 20A. Therefore, in assembly, an operator has only to fasten the mast nut 17 to an extent that the hollow portions of the spiral slits 24 cease to exist.

In contrast, as shown in FIG. 6B, the conventional mast spacer 120 includes the projections 123 as in the mast spacer 20A according to the present embodiment, and includes a bellows section 124 as the buffering structure. In the conventional mast spacer 120, by fastening the mast nut 17, a fastening load is exerted from the lower end (sleeve contact end 125) of the mast spacer 120 toward the upper end (bearing contact end 122) of the mast spacer 120, as in the mast spacer 20A.

Unlike the spiral slits 24, the bellows section 124 is not the cuts, and has a structure having a corrugated (undulant) cross-section. For this reason, the bellows section 124 is required to have some stiffness in the vertical direction. Unlike the spiral slits 24, the bellows section 124 is not deformed to an extent that a vertical hollow space ceases to exist, and the corrugated cross-section of the bellows section 124 is kept, when the mast nut 17 is fastened. For this reason, it becomes necessary to precisely adjust a degree to which the mast nut 17 is fastened, in order to adjust the amount of contraction of the bellows section 124. As a result, an assembly work for the driving power transmission device 10 becomes complicated.

As shown in FIG. 6B, in a case where the mast nut 17 is fastened in a direction of a block arrow F, the bellows section 124 is pushed and deformed in a direction of a white arrow D1. Thus, the radial dimension of the bellows section 124 is increased as indicated by an arrow D2. This follows that the outer diameter of the upper portion of the mast spacer 120 becomes excessively larger than that of the spacer body 121. Therefore, in a location corresponding to the upper portion of the mast spacer 120, there is a need for a radially wide space. Although the bellows section 124 is shown in FIG. 6B as a simple structure having only one stage for easier description, the same problem arises in plural-stage bellows section disclosed in Patent Literature 1, of course.

As described above, in the mast spacer of the present invention, the bearing contact end is fittable to the mast bearing, and the spacer body of the mast spacer is provided with the slits. By fitting the bearing contact end to the mast bearing, occurrence of the creep of the mast bearing can be suppressed. In addition, it becomes possible to suppress formation of the gap between the main shaft and the mast spacer because the slits serve as the buffering structure. Since the slits penetrate the side wall of the spacer body, it becomes possible to prevent a situation in which the outer diameter of the mast spacer becomes excessively large, which occurs in the conventional bellows section. Thus, the abrasion in the end surface of the bearing contact end or the fitting structure can be effectively suppressed without significantly changing the support structure for the main shaft.

The mast nut is fastened in the axial direction of the cylindrical spacer body. As fastening of the mast nut progresses, the dimension of the hollow portions of the slits is reduced, and the mast nut can be fastened to an extent that the hollow portions of the slits finally cease to exist. In other words, the upper limit of fastening the mast nut can be defined as the location in a state in which the hollow portions of the slits cease to exist. In a case where the driving power transmission device is assembled, the operator has only to fasten the mast nut to an extent that the hollow portions of the slits cease to exist. This can eliminate a need for a precise adjustment work in fastening the mast nut, which is necessary for the conventional mast spacer including the bellows section. As a result, complexity of the assembly work for the driving power transmission device can be avoided.

The present invention is not limited to the description of the above-described embodiments, and can be changed in various ways within a scope defined in claims. An embodiment obtained by suitably combining technical means disclosed in different embodiments or several modified examples is also included in the technical scope of the present invention.

INDUSTRIAL APPLICABILITY

The present invention can be widely used in the fields of a helicopter including a driving power transmission device using a mast spacer.

REFERENCE SIGNS LIST 10 driving power transmission device
11 main gear box
12 main shaft
13 upper bearing section
14 mast bearing
15 shaft sleeve
16 lower bearing section
17 mast nut
18 hub
20A, 20B mast spacer
21 spacer body
22 bearing contact end (upper end)
23 bearing projections (projections)
24 spiral slits (slits)
25 sleeve contact end (lower end)
26 linear slit (slit)
27 sleeve projections (projections)
30 helicopter
31 main rotor
32 tail rotor
33 engine
141 bearing inner race
144 inner race recess (recess)
152 stepped portion (of inner peripheral surface of shaft sleeve)
154 stepped portion recess (recess)

The invention claimed is:

1. A mast spacer provided between a mast bearing and a mast nut in a main shaft of a helicopter, the mast spacer comprising:
   a cylindrical body,
   a first end of the mast spacer being a bearing contact end which is fittable to an inner race of the mast bearing,
   the cylindrical body being provided with a slit penetrating a side wall of the cylindrical body, and
   the slit crossing an axial direction of the cylindrical body.

2. The mast spacer according to claim 1,
   wherein the slit has a straight-line shape or a shape including a curve line.

3. The mast spacer according to claim 1,
   wherein the bearing contact end includes a projection which is fittable to a recess provided in the inner race of the mast bearing, as a fitting structure which is fittable to the inner race of the mast bearing.

4. The mast spacer according to claim 1,
   wherein a second end of the mast spacer is a sleeve contact end which is fittable to a stepped portion provided in an inner peripheral surface of a shaft sleeve.

5. The mast spacer according to claim 4,
wherein the sleeve contact end includes a projection which is fittable to a recess provided in the stepped portion of the shaft sleeve, as a fitting structure which is fittable to the stepped portion of the shaft sleeve.

6. The mast spacer according to claim 1,
wherein the slit is provided in the cylindrical body in a location that is closer to the bearing contact end.

7. A driving power transmission device of a helicopter, the driving power transmission device comprising:
the mast spacer according to claim 1,
wherein in a case where a portion of the main shaft which is supported in such a manner that the main shaft is rotatable is a supported part, a portion of the main shaft which is close to the supported part is a lower side, and a portion of the main shaft which is secured to a hub is an upper side,
the mast spacer fixedly places the mast bearing in a location which is an upper portion of the supported part, by fastening the mast nut in an upward direction.

8. A helicopter comprising the driving power transmission device according to claim 7.

9. The mast spacer according to claim 1,
wherein the slit comprises one of a plurality of slits, each of the plurality of slits being intersected by a single virtual plane that is perpendicular to the axial direction.

10. The mast spacer according to claim 1,
wherein the slit comprises one of a plurality of slits, each of the plurality of slits overlapping with no more than two others of the plurality of slits in a vertical direction of the mast spacer.

* * * * *